United States Patent
Ufer (10) Patent No.: US 10,456,949 B2
(45) Date of Patent: Oct. 29, 2019

(54) DEVICE AND METHOD FOR PRODUCING FIBRE BOARDS

(71) Applicant: VOITH PATENT GMBH, Heidenheim (DE)

(72) Inventor: Jaromir Ufer, Munich (DE)

(73) Assignee: Voith Patent GmbH, Heidenheim (DE)

( * ) Notice: Subject to any disclaimer, the term of this patent is extended or adjusted under 35 U.S.C. 154(b) by 500 days.

(21) Appl. No.: 15/102,009

(22) PCT Filed: Dec. 1, 2014

(86) PCT No.: PCT/EP2014/076066
§ 371 (c)(1),
(2) Date: Sep. 12, 2016

(87) PCT Pub. No.: WO2015/082385
PCT Pub. Date: Jun. 11, 2015

(65) Prior Publication Data
US 2016/0368729 A1    Dec. 22, 2016

(30) Foreign Application Priority Data

Dec. 4, 2013  (DE) .................. 10 2013 224 835
Oct. 17, 2014  (DE) .................. 10 2014 221 085

(51) Int. Cl.
*B65H 29/24*  (2006.01)
*B65H 35/08*  (2006.01)
(Continued)

(52) U.S. Cl.
CPC .............. *B29B 11/16* (2013.01); *B26D 1/405* (2013.01); *B26D 7/015* (2013.01); *B26D 7/018* (2013.01);
(Continued)

(58) Field of Classification Search
CPC ...... B65H 29/43; B65H 29/241; B65H 35/08; B65H 2301/121; B65H 2406/3452; B26D 7/018
See application file for complete search history.

(56) References Cited

U.S. PATENT DOCUMENTS 3,847,710 A * 11/1974 Blomqvist ........ A61F 13/15756
156/351
5,222,422 A   6/1993 Benner, Jr. et al.
(Continued)

FOREIGN PATENT DOCUMENTS

CN   1732815 A   2/2006
CN   1917991 A   2/2007
(Continued)

*Primary Examiner* — Mark A Osele
*Assistant Examiner* — Christopher C Caillouet
(74) *Attorney, Agent, or Firm* — Laurence A. Greenberg; Werner H. Stemer; Ralph E. Locher (57) ABSTRACT

A device for manufacturing fibrous board has a board carrier and a plurality of at least four cutting tools for separating a fibrous material, in particular strand-shaped or tape-shaped fibrous material into portions, and for depositing the portions. The board carrier is displaceable below the depositing cutting tools here through in at least one movement direction. The depositing cutting tools are substantially stationary and are disposed beside one another in such a manner that the portions of these depositing cutting tools may be simultaneously deposited beside one another on the board carrier.

16 Claims, 9 Drawing Sheets

(51) Int. Cl.
   *B26D 7/01*      (2006.01)
   *B29B 11/16*     (2006.01)
   *B26D 1/40*      (2006.01)
   *B29B 15/12*     (2006.01)

(52) U.S. Cl.
   CPC ......... *B29B 15/122* (2013.01); *B65H 29/241* (2013.01); *B65H 29/243* (2013.01); *B65H 35/08* (2013.01); *B65H 2220/09* (2013.01); *B65H 2301/121* (2013.01); *B65H 2406/34* (2013.01); *B65H 2406/345* (2013.01); *B65H 2406/3452* (2013.01); *B65H 2701/177* (2013.01)

(56) References Cited

U.S. PATENT DOCUMENTS

| | | | | |
|---|---|---|---|---|
| 5,480,508 | A | * | 1/1996 | Manabe .................. B26D 3/08 156/353 |
| 6,086,694 | A | * | 7/2000 | Winter ..................... G09F 5/04 118/669 |
| 7,587,966 | B2 | | 9/2009 | Nakakado et al. |
| 2003/0205235 | A1 | | 11/2003 | Draghetti |
| 2006/0027065 | A1 | | 2/2006 | Spatafora |
| 2008/0196564 | A1 | | 8/2008 | McCabe |

FOREIGN PATENT DOCUMENTS

| | | |
|---|---|---|
| DE | 60302488 T2 | 8/2006 |
| DE | 102008033736 A1 | 1/2010 |
| DE | 102013224835 A1 | 6/2015 |
| EP | 0606830 A1 | 7/1994 |
| WO | 9515901 A1 | 6/1995 |

\* cited by examiner

DEVICE AND METHOD FOR PRODUCING FIBRE BOARDS

BACKGROUND OF THE INVENTION

Field of the Invention

The invention relates to a device and to a method for manufacturing fibrous boards. So-called fibrous boards are planar or slightly three-dimensional boards from fibrous material, which have a plurality of and often numerous layers of fibers. The fibers in the various layers may have dissimilar orientations. Such fibrous boards are used as semi-finished products for manufacturing components from fiber-reinforced plastics. Apart from the fibrous material, said fibrous boards may additionally also contain binder material or matrix material, that is to say plastics material. The further processing of the fibrous boards is performed by forming and curing or consolidating. Additionally, punching or cutting procedures may also be provided.

One example of the manufacturing of fibrous boards, in this case such fibrous boards which are already impregnated with matrix material (so-called prepreg boards) is to be found in EP 0606830 A1. Prepreg pieces are cut off from a prefabricated prepreg tape with longitudinally orientated fibers, and placed together beside one another to form a fibrous layer (laminate layer), and conveyed away in a trimming station. In order to be able to manufacture fibrous layers having dissimilar fiber orientation, a plurality of trimming stations which cut off and deposit the prepreg tapes at various angles are provided. Depending on the arrangement of the prepreg pieces, layers having a fiber orientation which in relation to the layers is longitudinal, transverse, or diagonal may be provided. In order to be able to better handle the layers, the prepreg pieces are welded together at the periphery. These fibrous layers are subsequently stacked on top of one another, on account of which fibrous board are created. By stacking fibrous layers having dissimilar orientation, fibrous boards having strength properties which are set in a targeted manner may be manufactured.

One disadvantage of the methods and devices known to date for manufacturing fibrous boards is the comparatively low production speed thereof. The productions speed is often measured as a depositing rate, that is to say as how much fibrous material in kg may be deposited per unit of time. One further disadvantage is the modest potential for variation in the arrangement of the fibers in terms of the alignment of the latter within one layer, and when switching over to another product. Higher production speeds are required in order to be able to economically manufacture comparatively small components, as for example in the automotive industry.

BRIEF SUMMARY OF THE INVENTION

It is the object of the invention to provide a device and a method offering higher productivity, in particular a higher depositing rate, and at the same time high accuracy and a high potential for variation in terms of the fiber orientation and arrangement.

The object according to the invention is achieved by a device as claimed in the main device claim. This device contains a board carrier and a plurality of at least four depositing cutting tools for separating fibrous material, in particular strand-shaped or tape-shaped fibrous material, into portions, and for depositing the portions. These depositing cutting tools each have one separation roller having a plurality of cutters, which are disposed on the roller circumference of the separation rollers, and each have one counter roller, the latter and said separation roller being rotatable in opposite directions and being disposed such that the fibrous material is guided through between the separation roller and the counter roller and thereby by interaction with the counter roller may be severed by one of the cutters such that a portion is created on account thereof. Furthermore, a plurality of integrated retaining regions and a plurality of releasing elements are present on the counter roller or on the separation roller, configured such that in each case at least one of the retaining regions may exert a retaining force on a respective portion, on account of which the portion is retained on the roller having the retaining regions and, after severing, may be moved conjointly with the roller circumference of this roller by a distance. The releasing elements are configured such that the same for depositing may move the portion away from the roller circumference, and such that the respective portion after having been conjointly moved on the roller may be deposited.

The board carrier here is displaceable below the depositing cutting tools herethrough in at least one movement direction (Y), and the depositing cutting tools are substantially stationary and are disposed beside one another in such a manner that the portions of these depositing cutting tools may be simultaneously deposited beside one another on the board carrier.

The advantages lie therein that very high depositing rates which to date have not been possible can be implemented by cutting the portions with the aid of rollers, which is readily automatable, and by depositing portions in parallel from a plurality of depositing cutting tools onto the board carrier. High accuracy during depositing and at the same time high flexibility are nevertheless achieved by retaining the portions on the roller surface and by depositing the portions in a controlled manner by way of die elements. Depositing rates between 5 and 8 kg/h per depositing cutting tool are possible, in particular. Depositing rates of significantly more than 20 kg/h are thus possible with the device. And even far beyond if and when, for example, 8, 10, or even more depositing cutting tools are present beside one another.

Substantially stationary is understood to mean that the individual depositing cutting tools are embodied such that the latter during operation do not perform any comparatively large translational movements. The depositing cutting tools in terms of the stationary position thereof may at best be displaced by minor actuation paths ($\Delta X$, $\Delta Y$, $\Delta Z$) which in particular are smaller than the length A of the portions, and/or may be rotated about the imaginary Z axis which is perpendicular to the board carrier. The length A is the cut length of the portions.

Rovings, fiber strands, or tapes, in particular unidirectional fiber tapes, fabric tapes, cross-laid structure tapes, or non-woven tapes, may be considered as fibrous material. The fibers for the fibrous material may be carbon fibers, glass fibers, aramid fibers, or other fibers. A fiber strand may be composed of twisted or spun fibers. A fiber strand from numerous fibers which in a non-twisted form are simultaneously unwound from a package or a ball, is referred to as a yarn bundle or a roving. The rovings here may be composed of up to a plurality of ten thousand endless individual fibers which are disposed in parallel and which are also referred to as filaments. If and when a roving is employed as fibrous material, said roving prior to separation is preferably spread out such that the fibers lie beside one another and in this position are retained by the retaining region and are subsequently deposited. The fibrous material is preferably largely or completely composed of fibers. However, said fibrous material may readily also contain binder material or matrix material. And the fibrous material may also contain comparatively large amounts of binder material or matrix material, for example if and when a so-called prepreg, in particular a thermoplastics prepreg, is processed. Prepreg is a fibrous material which has already been impregnated with matrix material which later, for example after forming, is cured and or consolidated. Duromer plastics, such as, for example, epoxy resins or thermoplastics, are considered as matrix materials.

A plurality of rovings or fiber strands or tapes beside one another may likewise be simultaneously infed to a depositing cutting tool and be separated into portions. The portions in terms of width are then formed by a plurality of fiber strands or tapes. The width of the portions is preferably between 10 and 100 mm. Using the device according to the invention, in particular comparatively long portions may also be manufactured and deposited in a controlled manner at a high depositing rate. Lengths for the portions are preferably between 10 and 300 mm, particularly preferably between 40 and 100 mm. The spacings of the adjacent cutters on the roller circumference of the separation roller are preferably conceived in a corresponding manner.

The separation rollers each have preferably at maximum 20, particularly preferably each have 4 to 6 cutters which are distributed across the circumference. A size for the separation rollers is considered to be a diameter between preferably 50 and 300 mm, particularly preferably between 100 and 200 mm.

Further advantageous features of the embodiment according to the invention are to be found in the dependent claims.

In one further preferred embodiment, one or a plurality of transfer units which are configured such that the respective portions from the releasing elements are initially deposited on the surface of the transfer unit, and from there may be transferred onto the board carrier are provided. A suction roller or a vacuum conveyor belt may be considered as a potential transfer unit. The rotation direction of the suction roller or of the vacuum conveyor belt, respectively, is preferably transverse, particularly preferably perpendicular to the rotation axis of the roller of depositing cutting tool. One respective transfer unit may be assigned to each depositing cutting tool, or a plurality of depositing cutting tools may deposit the portions thereof beside one another on the surface of one transfer unit such that the portions are then collectively transferred by the transfer unit onto the board carrier. Only a single common transfer unit onto the surface of which all depositing cutting tools deposit the portions thereof could also be present.

The advantage of a transfer unit being present is that a certain spacing between the depositing cutting tool and the board carrier may be bridged thereby, making the device more flexible. A further advantage is that an attractive force (by way of a vacuum, for example) may be exerted on the portions by the transfer unit, thus making possible a controlled removal from the depositing cutting tool. In particular, an attractive force which is always identical may be exerted therewith. In the case of the board carrier this is not possible in such a simple manner; in the case of a vacuum suction being used, for example, the attractive force would be significantly reduced and would no longer be effective when a plurality of layers are deposited.

In one further embodiment, the device is configured such that the minimum spacing when depositing between the die element and the board carrier, or between the releasing element and the surface of the transfer unit is between 0 and 70 mm, preferably between 1 and 10 mm, depending on whether a transfer unit is present or not. On account thereof, controlled depositing by the releasing elements is possible also at a high speed. In particular when radially displaceable die elements are used, the spacing of the deployed die elements from the face onto which depositing takes place may be greater than 0 mm, that is to say that the dies do not touch this face during depositing. On account thereof it is avoided that portions which have already been deposited are subsequently displaced. Moreover, wear, damage to fibers, and the creation of undesirable noise are reduced.

Moreover, one or a plurality of binder application installations which are disposed such that said binder application installations may apply binder material onto the portions are provided. This application may be performed prior to the portions being deposited, for example on the transfer unit, or after said portions have been deposited on the board carrier. An adhesive, or a thermoplastic material, or a matrix material may be considered as binder material. The binder material may be applied as a solution, or as a melt, or as a resin, or as a powder.

It is particularly advantageous for the releasing elements to be embodied as die elements which are displaceable in a substantially radial manner. On account thereof, the portion may be reliably moved away from the roller surface. This movement of the die elements may be performed by a gate-type guide, for example. However, the releasing elements may also be peeling wires or blow-down elements which are disposed in a corresponding manner.

Alternatively or additionally to the embodiment as a die element, the releasing elements may me embodied as retaining elements having an integrated retaining region. This could be, for example, in such a manner that the retaining elements are suctioned. For depositing, the vacuum supply may be interrupted, and/or blowing-down is activated.

The retaining regions on the die element or on the surface of the roller may be embodied such that the retaining force is applied by a vacuum on a perforated or permeable face, wherein a vacuum supply which in the circumferential region in which the portion is to be deposited is deactivatable or is capable of being interrupted is provided. Alternatively, the retaining force may be generated by electrostatic attraction. Mechanical elements such as clamps or needles are also conceivable.

In one particularly advantageous embodiment, the cutting tools in the movement direction (Y) of the board carrier are sequentially disposed in two or more rows, in particular such that the depositing cutting tools of one row are disposed so as to form a gap in relation to the cutting tools of the other row. In the case of a plurality of rows, for example of three or four rows, the depositing cutting tools may each be disposed so as to be offset in relation to one another in a cascaded manner. By displacing the board carrier in the movement direction (Y), and by depositing portions multiple times, a compact fibrous layer may be gradually deposited on the board carrier. The total width of the deposited layer is a result of the number of depositing cutting tools which are disposed beside one another, and of the length of the portions. Particularly preferably, so many depositing cutting tools are provided beside one another that the latter cover the entire width of the desired fibrous board in one depositing procedure. In the case of a portion length of 100 mm, for example, and of 12 depositing cutting tools in three rows each having four depositing cutting tools set at a gap, a depositing width of 1.2 m results for the fibrous board. By way of the arrangement in a plurality of rows enough space for the depositing cutting tools and the drive and supply units thereof is created without the risk of potential collision, and without gaps being created between the deposited portions in the fibrous layer.

The depositing cutting tools may be embodied such that the former may be displaced in terms of the stationary position thereof by minor actuation paths ($\Delta X$, $\Delta Y$, $\Delta Z$) which are smaller than the length A of the portions. Furthermore, said depositing cutting tools may be optionally embodied so as to be rotatable about the imaginary Z axis which is perpendicular to the board carrier. Setting of the exact alignment and orientation of the portions on the board carrier is possible by way of these actuation movements. This also enables arcuate depositing of the portions. Board carriers which are configured so as to be slightly three-dimensional may also be filled by an actuation movement in the direction Z. That is to say that slightly pre-formed fibrous boards may thus be manufactured. The movement intended for enabling dissimilar regions of one fibrous layer to be sequentially deposited is not performed by way of a movement of the depositing cutting tools, but by way of a movement of the board carrier. The actuation paths are provided only for influencing the depositing pattern or the accuracy of depositing.

It is also advantageous for the various depositing cutting tools to be able to be individually controlled. On account thereof, the exact depositing position, the spread, or another setting, may be controlled in a positionally accurate manner.

It is furthermore advantageous for the board carrier, additionally to the movement direction Y to also be able to be moved transversely thereto, in the direction X and/or along the height Z. On account thereof, fibrous boards which are wider than as would correspond to the number of depositing cutting tools may also be manufactured. Moreover, the board carrier may also be embodied so as to be rotatable about the imaginary Z axis which is perpendicular to the board carrier, such that various angles for the fiber orientation in the individual fibrous layers may be produced.

In order to enable efficient production of a comparatively high piece count, the board carrier may be a support plate or a film which is disposed on a table which is movable at least in the movement direction (Y). After the fibrous board has been deposited, the former together with said support plate or film may be removed and further processed.

In order to be able to further increase flexibility and the depositing rate, additional depositing cutting tools which are suitable for separating further fibrous material into portions and for depositing these portions on the fibrous material which is being infed to the depositing cutting tools may be provided. The axes of the rollers of the further depositing cutting tool are preferably aligned so as to be transverse to the roller axes of the other depositing cutting tool. So-called biaxial or multi-axial fibrous portions may thus be produced and deposited.

In terms of the method according to the invention, the object is achieved by a method as claimed in the main method claim. Here, using a device according to the invention, the following steps a) to d) are carried out in sequence:
a) separating a respective portion of fibrous material simultaneously in the plurality of depositing cutting tools;
b) retaining the respective portion on the counter roller or on the separation roller, and moving the portion conjointly with the roller circumference of this roller simultaneously in the plurality of depositing cutting tools;
c) depositing the respective portions beside one another simultaneously by way of the plurality of depositing cutting tools; and
d) moving the board carrier in at least one movement direction (Y);
e) repeating steps a) to d) multiple times in such a manner that a layer of portions is produced on the board carrier; moreover one or a plurality of further layers of portions are produced on the first layer by repeating steps a) to e).

A fibrous board is thus produced in an efficient manner and with high accuracy and with high flexibility in terms of the design embodiment of the arrangement of fibers. A further advantage lies in that this method is very readily automatable. The method may be readily adapted to various products, that is to say to various predefined parameters in terms of the construction of the layers or of the size of the fibrous board. Moreover, the fibrous boards which are constructed from individual portions may be readily deformed. Said fibrous boards thus offer a good prime material for manufacturing various and even complex components.

In order for a fibrous layer to be fixed, binder material may advantageously be applied onto the portions after the latter have been deposited, wherein this binder application is performed in particular between steps c) and d), or in particular after step e) and prior to a further layer being deposited. In the case of a transfer unit being present, the binder application may also be performed after the portions have been deposited onto the surface of the transfer unit and prior to being transferred to the board carrier.

In one further embodiment, in particular if and when the board carrier is a support plate or a film, and in particular when the binder material is applied in a pulverulent form, the board carrier having one layer or having a plurality of layers, or having a fibrous board, respectively, may be moved out of the region of the depositing cutting tools and moved into the region of a heating installation. The heating installation may activate the binder material by heating the latter. In this way, fibrous layers or fibrous boards, respectively, may be alternatingly be deposited onto a board carrier, and the binder material may be subsequently activated.

Moreover, the board carrier after step e) and prior to a further layer being deposited may be displaced in a direction (X) which is transverse to the movement direction (Y), and/or may be rotated in a rotation direction (C) about the Z axis. On account thereof, offset fibrous layers, and fibrous layers having dissimilar main fiber directions are possible. Various fibrous boards having an adapted layered structure may thus be manufactured in a very flexible manner with the device.

In particular, the depositing cutting tools may also be embodied as the device described in the as yet unpublished application DE 10 2013 224835 by the same applicant.

BRIEF DESCRIPTION OF THE SEVERAL VIEWS OF THE DRAWING

Further advantageous embodiment styles of the invention will be explained by means of exemplary embodiments with reference to the drawings. The features mentioned may not only be advantageously implemented in the illustrated combination but may also be individually combined with one another. In the figures and in detail.

DESCRIPTION OF THE INVENTION

The figures are described in more detail hereunder. A fragment of a device according to the invention, with a detailed illustration of a depositing cutting tool, can be seen in FIG. 1. The fibrous material 21 is guided by a contact roller 40 onto the counter roller 23. The separation roller 24 has cutters 26, which are disposed on the circumference, and releasing elements which are embodied as radially displaceable die elements and as retaining elements 27 having an integrated retaining region. In this case, said releasing elements are embodied as vacuum retaining elements. One of the cutters 26 is shown separating a portion 22 of fibrous material. The counter roller 23 has matching depressions 29 into which the respective cutter 26 engages. The depression 29 may be vacant such that the fibers of the fibrous material are broken across the edge of the cutter, or said depression 29 are filled with an elastic material, for example a round rubber cord, such that the fibers of the fibrous material are cut by pressure acting on the edge of the cutter. A further portion 22 by way of a further retaining element 27 is moved conjointly with the roller circumference. The retaining elements 27 are provided with a vacuum connector 33 and are suctioned, so as to retain the portion 22 on the roller. An even further portion 22 has already been deposited on the board carrier which is formed by the table 5. Said even further portion 22 has been moved away from the roller circumference 28 by a retaining element 27 which has been urged outward by a spring element 32, has been provided with an impulse, and been transferred onto the table 25. The vacuum supply here has been interrupted, thus releasing the portion 22 from the retaining element 27. Additionally, a short compressed-air pulse may be applied by way of the vacuum openings of the retaining element 27 in order for the portion 22 to be released. A binder application device 34 which may meter binder material onto the retaining elements 27 is shown as an option. The movement direction Y of the table 5, in which the latter is traversable, is aligned so as to be perpendicular to the plane of the sheet. On account thereof, the portions 2 are deposited transversely to the main fiber direction of the fibrous material 1. The length of a portion is A.

Figure 1:
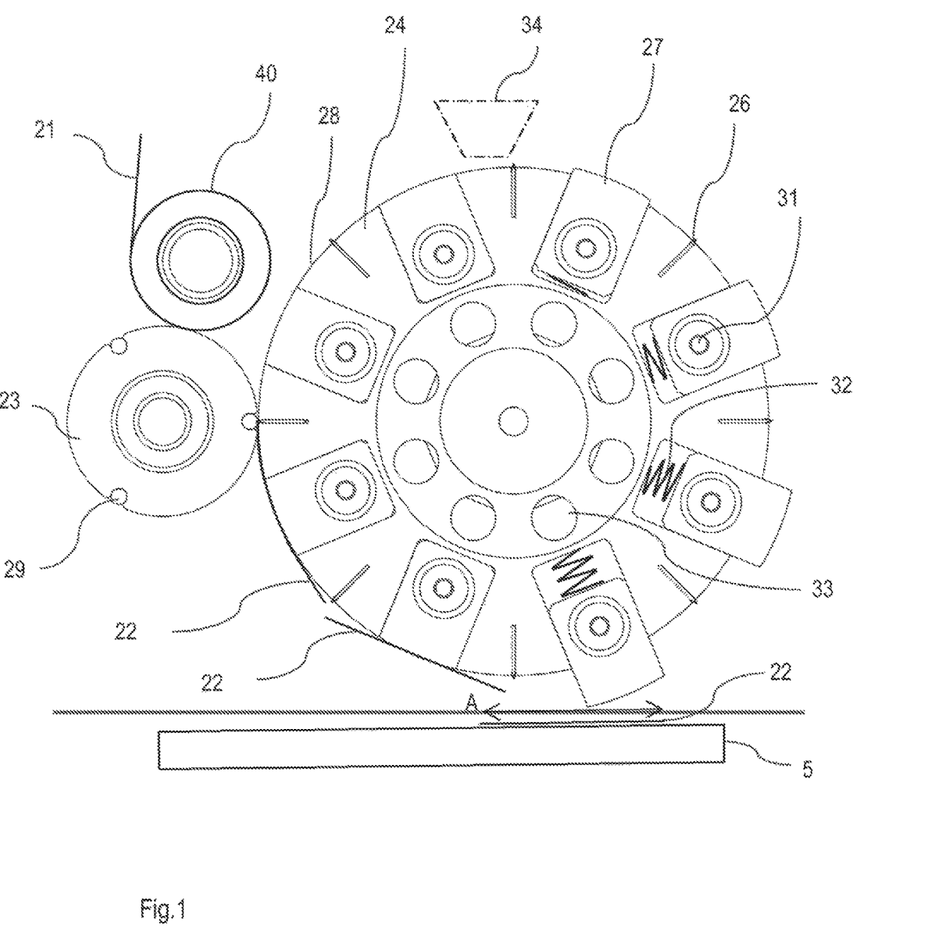
FIG. 1 shows a fragment of a device according to the invention, with a detailed illustration of an embodiment of a depositing cutting tool.
Figure 2:
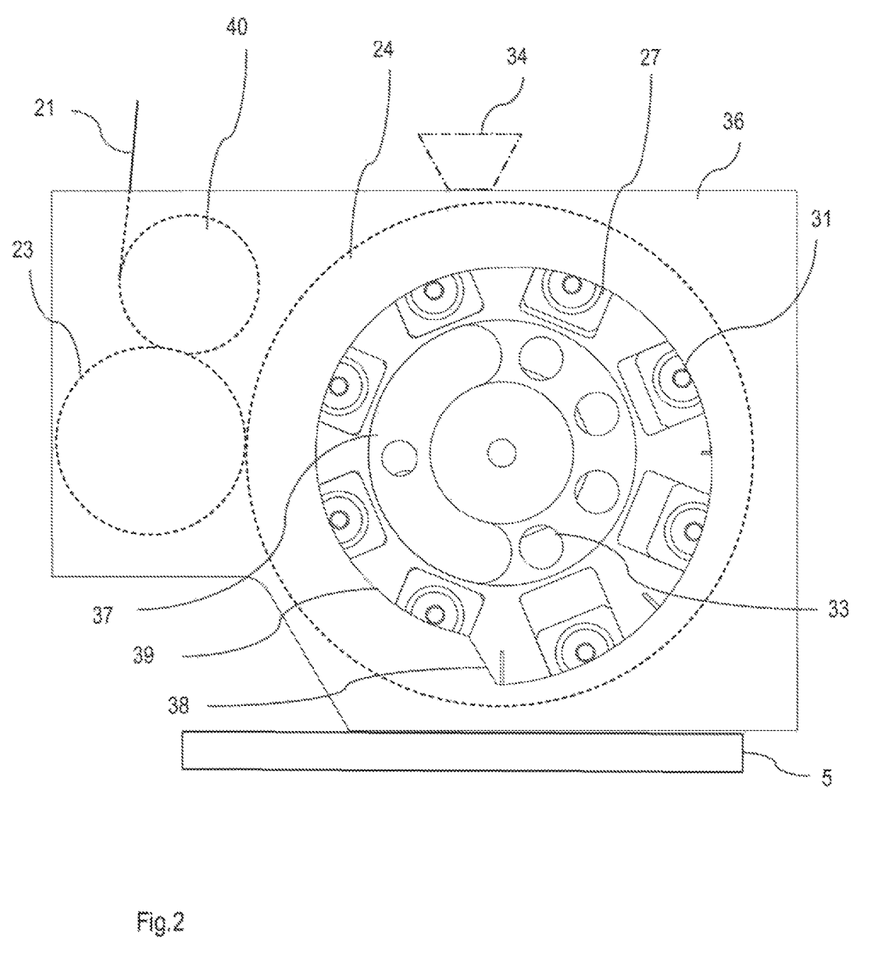
FIG. 2 shows an illustration of this embodiment having a gate-type guide.

A fragment as in FIG. 1 is shown in FIG. 2, wherein the depositing cutting tool is embodied having a gate-type guide 36 for controlling the retaining elements 27. Each retaining element 27 has an idler roller 31 which is preferably mounted so as to be rotatable in the retaining element. The spring elements 32 urge the retaining elements 27 outward to the point where the respective idler roller 31 stops on the stop edge 39 of the gate-type guide 36. An increment 38 in the region of the depositing position leads to the spring-loaded retaining elements 27 at this point to jump outward, impacting against the stop edge 39. On account thereof, the portion 22 is moved away from the roller circumference 28 and by way of an impulse is deposited onto the table 5. The vacuum supply is performed by way of a stationary vacuum port 37 which is connected to a negative-pressure source. The vacuum port 37 covers the vacuum connectors 33 in that region in which the portions 22 are intended to be retained. The vacuum connectors 33 in the region of depositing are vacated such that the retaining elements 27 are ventilated, causing the retaining force to disappear. The portion 22 may be released from the retaining element 27, being deposited in the manner described above. Additionally and optionally, a compressed-air port may supply air into the retaining elements in the region of depositing such that the portions 22 are able to be blown down from the retaining element. The stop edge 39, which in the continuation thereof is helically embodied, by way of the idler roller 31 of said retaining elements 27 urges the latter back into the initial position thereof.

The gate-type guide 36 may be present on one side or preferably on the front and the rear side of the device. Tilting of the retaining elements 27 is reliably avoided by way of an embodiment on both sides.

Figure 3:
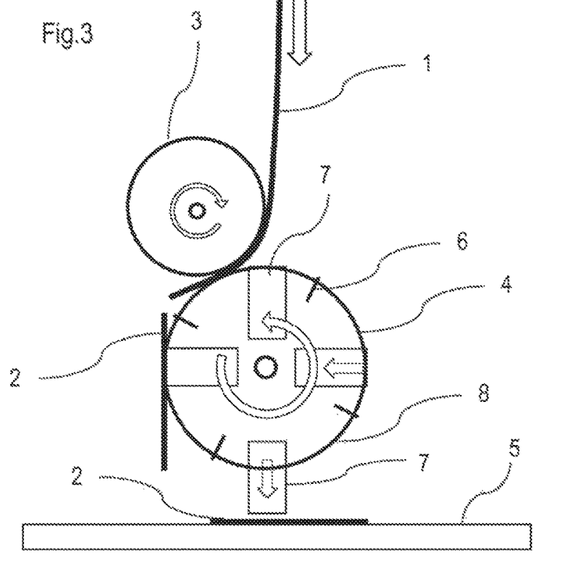
FIG. 3 shows a fragment of a further device according to the invention, with a schematic illustration of a depositing cutting tool.

FIG. 3 shows a simplified schematic illustration of a portion of a further device according to the invention. The fibrous material 1 is infed to the depositing cutting tool. The portions 2 are cut by the cutters 6 between the counter roller 3 and the separation roller 4. Here too, the releasing elements are embodied as die elements and as retaining elements 7. In order for the portions 2 to be deposited onto the board carrier which again is embodied as a table 5, the retaining elements 7 are radially displaceable. The portion 2 is moved away from the roller surface 8 by the retaining elements 7, the retaining force, for example the vacuum force, is reduced, and the portion 2 is deposited on the table 5. However, it is also possible for the retaining force not to be reduced but to be overcome by the influence of the releasing element and/or by an attractive force of a transfer unit or of the board carrier. This concept may be pursued in particular when electrostatic attraction is used as a retaining force. A minimum spacing of greater than 0 mm, in particular of between 1 and 10 mm is preferably provided between the releasing element (retaining element 7) and the board carrier (table 5) during depositing. Even if this is not explicitly shown in the other figures, depositing in the other embodiments described may likewise be performed at a spacing of greater than 0 mm and without direct contact.

Optionally, the table may also be embodied such that the former exerts a retaining force on the deposited portions; the former may be embodied as a vacuum table having a suctioned surface, or having an electrostatic load, for example. In a preferred embodiment, the die elements, presently embodied as the retaining elements 7, may be disposed so as to be eccentric between two cutters 6, particularly preferably in such a manner that the retaining element 7 is displaced, counter to the rotation direction of the separation roller 4, toward the adjacent cutter 6. On account thereof the portions 2 are well fixed during cutting.

Figure 4:
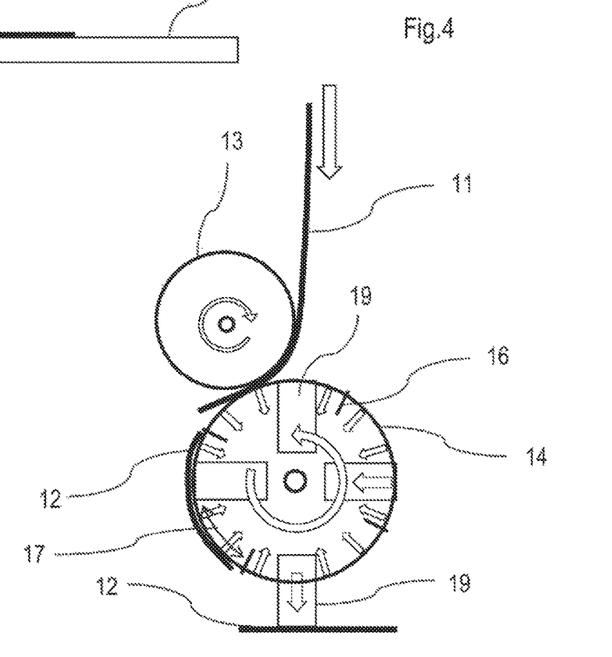
FIG. 4 shows a schematic illustration of another depositing cutting tool.

Another embodiment of a cutting depositing tool is shown in FIG. 4. The retaining regions 17, which retain the portion 12 on the separation roller 14 after cutting, are present in the region of the surface of the separation roller 14, between the releasing elements which are embodied as radially displaceable die elements 19. As is the case in the previous embodiment, the retaining force which is illustrated as arrows drawn to point radially inward may be produced by a vacuum or by electrostatic attraction, for example. As is illustrated, two retaining region may also each be present beside the releasing element, so as to be between two cutters 6.

Figure 5:
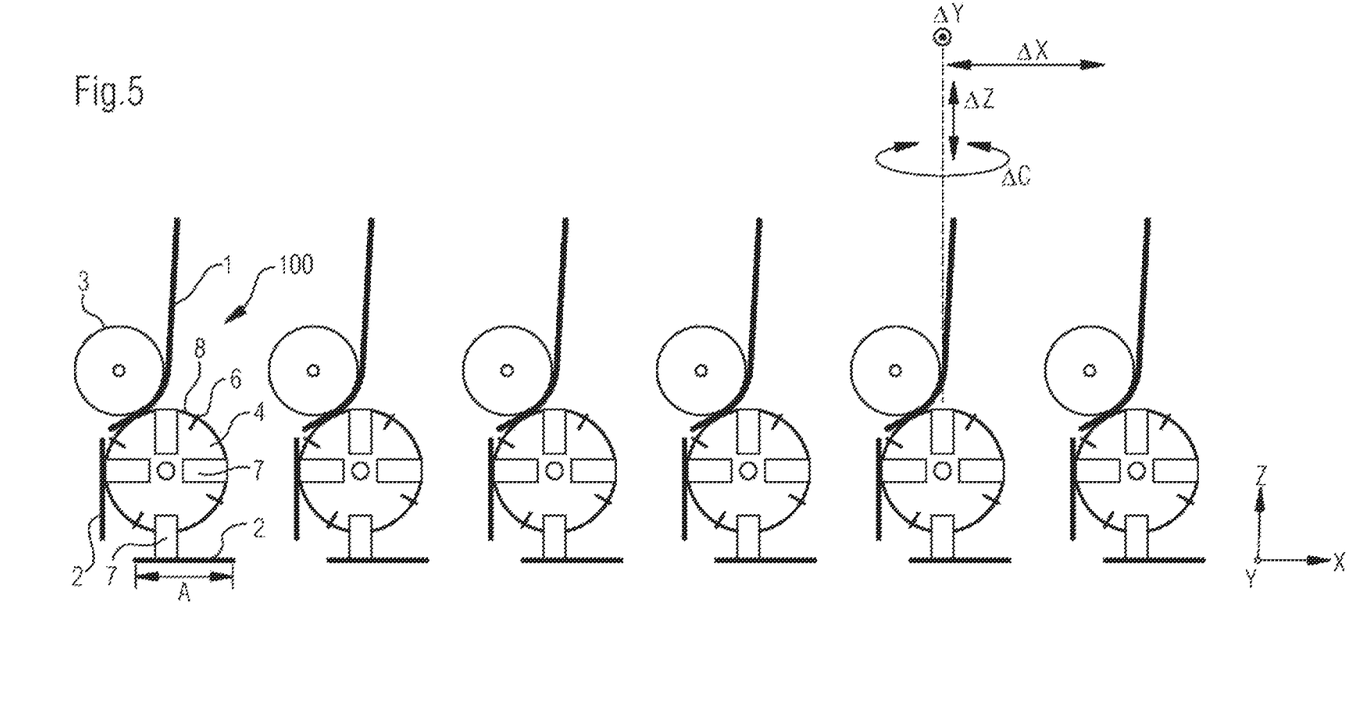
FIG. 5 shows a schematic illustration of a device according to the invention, having depositing cutting tools in one row.

The illustration in FIG. 5 shows a device according to the invention, having six depositing cutting tools 100. Identical elements in the schematic illustration are provided with identical reference signs. The depositing cutting tools 100 are displaceable by minor actuation paths ΔX, ΔY, ΔZ which are preferably smaller than a portion length A. Said depositing cutting tools 100 may additionally also be rotatable about the Z axis (ΔC). The smaller the spacings between two depositing cutting tools 100, the more compact the manner in which the portions may be deposited in one operational step. In the arrangement shown, a lateral movement in the direction X could initially be performed prior to an onward movement of the board carrier (not shown) in the direction Y, such that the gaps are filled with portions. Alternatively, the board carrier may initially also be moved in the direction Y, a lateral movement in the direction X then being performed, in order for the gaps to be filled.

Figure 6:
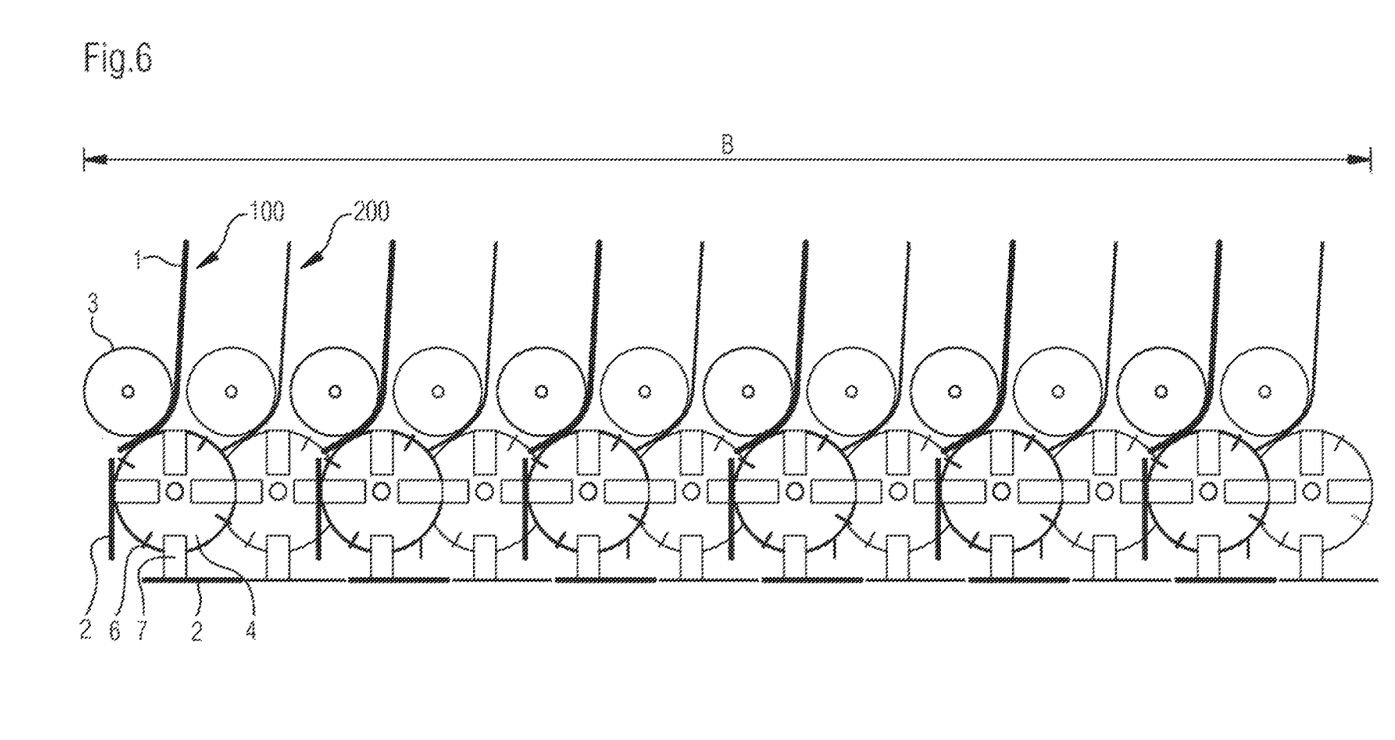
FIG. 6 shows a schematic illustration of a device according to the invention, having depositing cutting tools in two rows.

A device according to the invention, having 12 depositing cutting tools 100, 200, disposed sequentially in two rows, can be seen in FIG. 6. The entire depositing width B may be deposited simultaneously. By way of the offset arrangement of the depositing cutting tools so as to form a gap there remains sufficient space for drive and supply devices of the depositing cutting tools. By traversing the board carrier (not shown) in the direction Y, presently in a manner perpendicular to the plane of the sheet, the portions may be deposited in a planar and compact manner without the depositing cutting tools having to be displaced in terms of the position thereof. In order for an even higher depositing rate to be enabled, three or four rows of depositing cutting tools which are sequentially disposed so as to form a gap or to be offset in a cascaded manner may also be present. The displacement movement of the board carrier is advantageously adapted to the cycle rate of the depositing cutting tools such that the respective gaps between portions which have already been deposited are exactly filled. On the other hand, targeted overlapping or a targeted gap between the deposited portions may also be produced in one fibrous layer. The individual depositing cutting tools may be embodied such that they may be individually controlled in terms of speed, actuation path, and spread.

Figure 7:
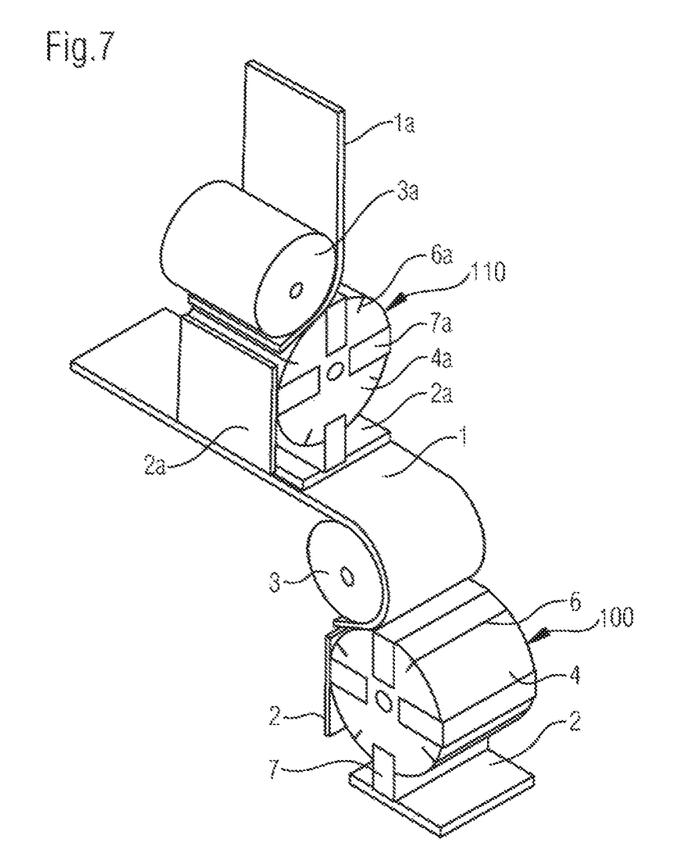
FIG. 7 shows a schematic illustration of a depositing cutting tool having a further depositing cutting tool.

FIG. 7 shows a depositing cutting tool 100 having an additional depositing cutting tool 110 which is disposed in the axes of the rollers 3a, 4a, so as to be transverse in particular perpendicular to the axes of the rollers 3, 4. On account thereof, a biaxial portion may be produced from the fibrous material 1a and 1 and be deposited. The alignment of the additional depositing cutting tool 110 may also be oblique such that an angle other than 90° is created between the two portions. In order for the two portions to be able to be reliable transported together, one of the fibrous materials 1, 1a may contain binder or matrix material, or the latter may be applied by way of a binder application installation.

Figure 8:
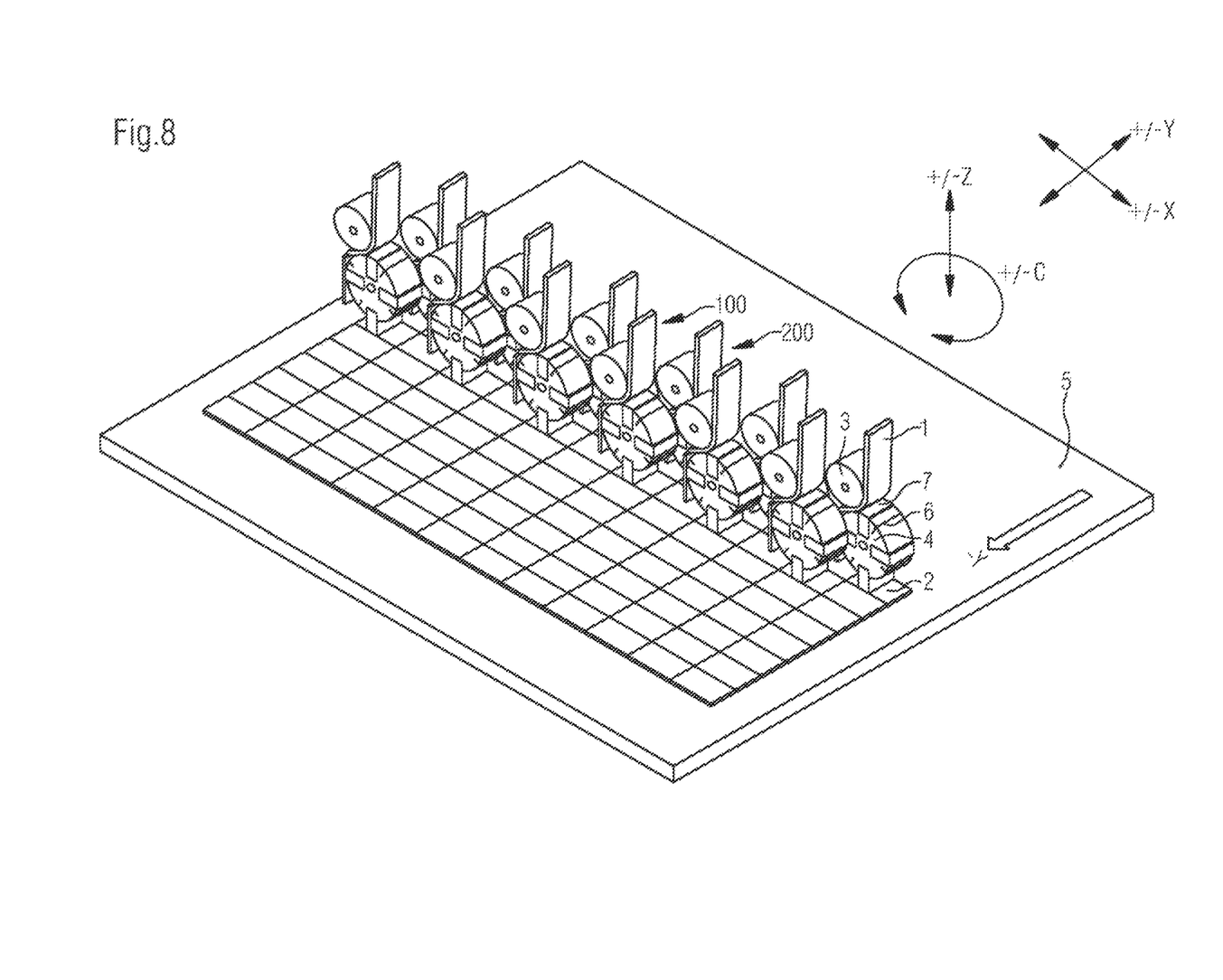
FIG. 8 shows a perspective and schematic illustration of a device according to the invention, having depositing cutting tools in two rows.

FIG. 8 shows a perspective illustration of a device according to the invention. Twelve depositing cutting tools 100, 200 are again sequentially disposed in two rows. It can be seen how a compact fibrous layer may be produced from two portions 2 by displacing the board carrier, presently the table 5, in the direction Y. After a first fibrous layer, one or else numerous further fibrous layers from portions 2 may still be deposited onto the first fibrous layer. Between the fibrous layers being deposited, the table 5 may be rotated about the Z axis (+/−C), or be additionally displaced in the direction X, respectively. A desired fibrous structure may be constructed in a very flexible manner in this way. Additionally, movement of the table 5 in the direction Z is also possible, for example in order to modify the spacing between the depositing cutting tools 100, 200 and the board carrier. Activation of the binder may be performed between depositing the individual fibrous layers, or successively after a certain number of portions 2 have been deposited, or else after a plurality of fibrous layers, or the entire fibrous board, respectively, have/has been deposited. This may be performed by heating by way of a heating installation, for example.

Figure 9:
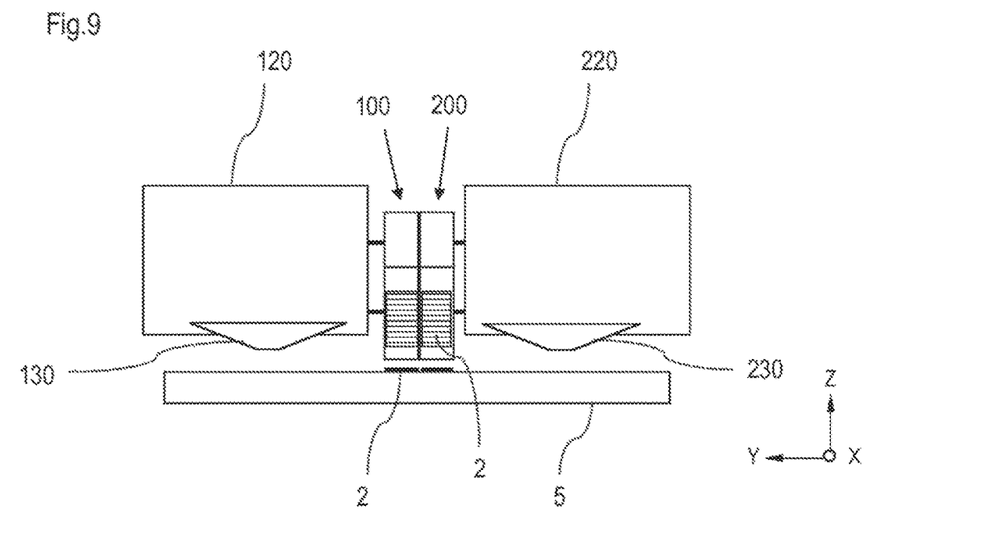
FIG. 9 shows a schematic side view of a device having depositing cutting tools in two rows.

The illustration in FIG. 9 shows a schematic side view. A first row of depositing cutting tools 100, and a second row of depositing cutting tools 200, are disposed in direct sequence. The necessary drive and supply installations 120, 220 are provided on the external side, respectively. Respective binder application installations 130 and/or 230, which may apply binder material onto the deposited portions 2, may additionally be present. Binder application installations may also be present in the other embodiments described here above and herebelow. A compact predefined fibrous layer, or one which corresponds to the desired structure, may be deposited by displacing the table 5, which presently again serves directly as a board carrier, in the direction Y.

Figure 10:
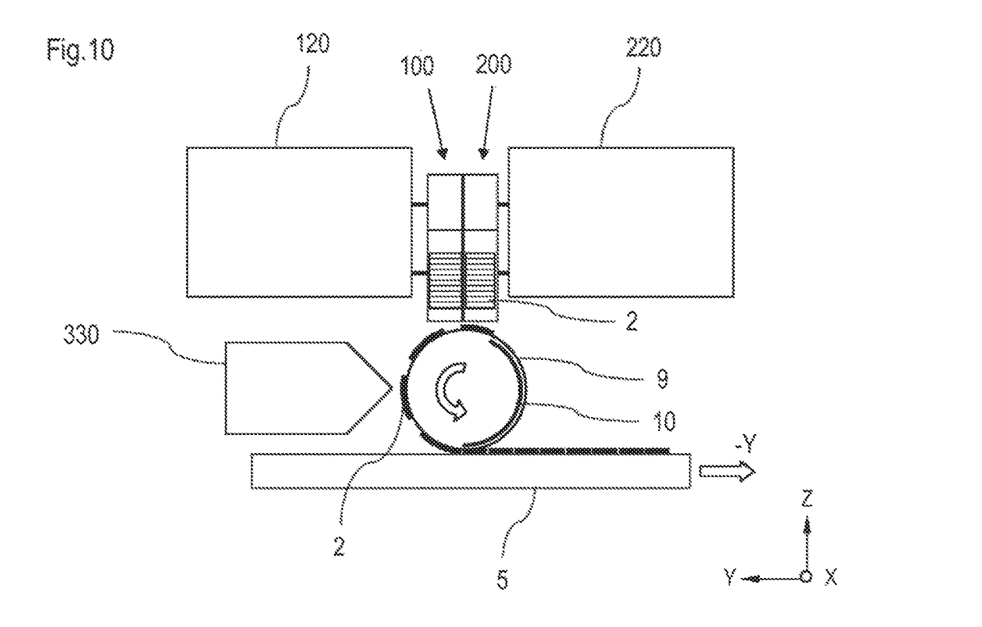
FIG. 10 shows a schematic side view of a further device having depositing cutting tools in two rows, and a transfer unit.

FIG. 10 illustrates a further device according to the invention, having a transfer unit 9. This is again a side view. As opposed to the embodiments described so far, the portions here are not deposited directly onto the table 5 serving as a board carrier, but are initially deposited onto the surface of the transfer unit 9. The transfer unit 9 may be embodied as a suction roller, as a vacuum conveyor belt, or as any other roller or conveyor belt which may retain and again release the portions. In the example illustrated, an internal vacuum cover which ensures that the portions 2 are able to be transferred by the transfer unit 5 onto the table 5 is present. It may be of advantage here if the board carrier, that is to say presently the table 5, is embodied in such a manner that the latter by way of electrostatic charging or by way of a vacuum attracts and fixes the portions. A binder application installation 330 on the transfer unit 9 may apply binder material onto the portions. Alternatively, the binder application installations which have been previously shown may be employed. The advantages of such a transfer unit have already been mentioned above.

Figure 11:
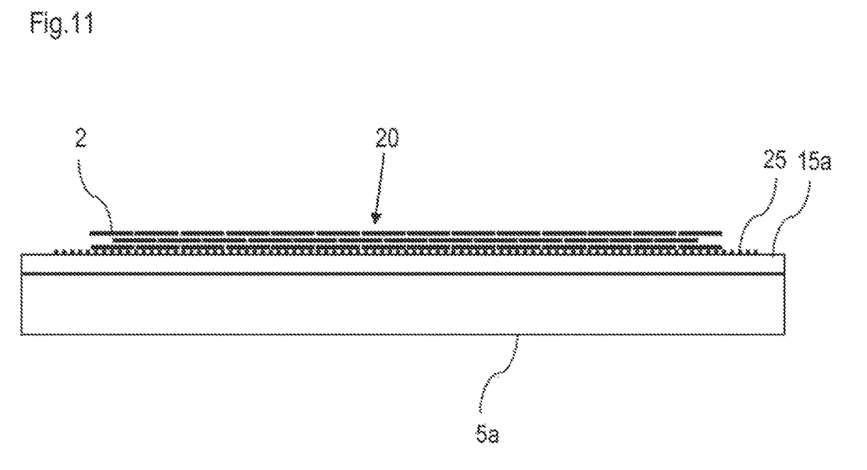
FIG. 11 shows a schematic illustration of a fibrous board on a film.

FIG. 11 shows a potential fibrous board 20 having a plurality of fibrous layers which each are constructed from portions 2 which have been deposited by a device according to the invention. The portions 2 in this case have been deposited onto a film 25 which serves as a board carrier. The film 25 in turn lies on a support plate 15a which is connected to the table 5a. The support plate 15a may be released from the table 5a for further processing. A new support plate is put in place for manufacturing the next boards. A variant in which the fibrous board 20, which has been deposited and under certain circumstances has been fixed with binder material or already been impregnated with matrix material, is disposed between two films 25 and 25a can be seen in FIG. 12. A seal 30 is additionally provided in an encircling manner between the films. If the fibrous board 20 between the films is now evacuated, the former may very well be transported together with the support plate and then be formed, for example in a forming installation. Largely automated transportation between the operational steps in a production line may be implemented by using support plates 15*a*.

Figure 12:
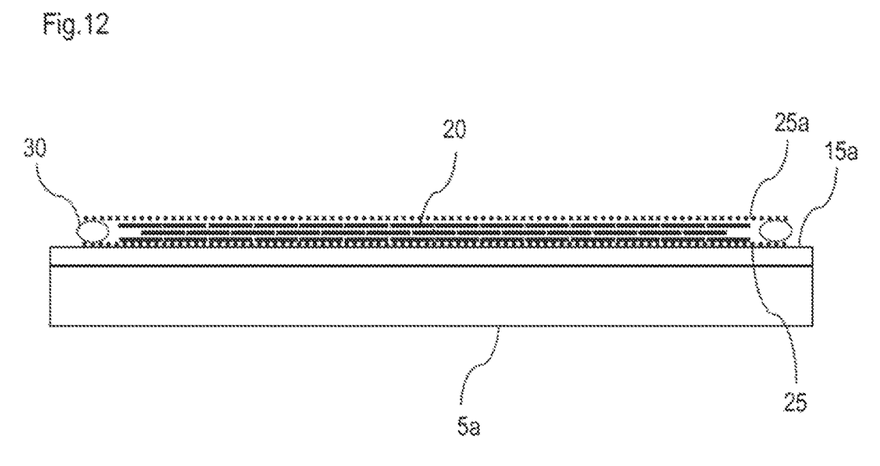
FIG. 12 shows a schematic illustration of a fibrous board between two films.

The variants illustrated in FIGS. 11 and 12 are applicable to all embodiments shown and described. Moreover, the portions may also be deposited without an interdisposed film onto a support plate which then serves as a board carrier.

LIST OF REFERENCE SIGNS

1, 1*a*, 11, 21 Fibrous material
2, 2*a*, 12, 22 Portion
3, 3*a*, 13, 23 Counter roller
4, 4*a*, 14, 24 Separation roller
5, 5*a* Placing table
6, 6*a*, 16, 26 Cutter
7, 7*a*, 27 Retaining element
8, 28 Roller circumference
9 Transfer unit
10 Vacuum cover
15, 15*a* Support plate
17 Retaining region
19 Die element
20 Fibrous board
25, 25*a* Film
29 Depression
30 Seal
31 Idling roller
31 Spring element
33 Vacuum connector
34, 130, 230, 330 Binder application installation
36 Gate-type guide
37 Vacuum port
38 Increment of the stop edge
39 Stop edge
40 Contact roller
100 Depositing cutting tool of the first row
110 Additional depositing cutting tool
120, 220 Drive and supply device
200 Depositing cutting tool of the second row
A Length of the portion
B Depositing width
ΔC Rotation about the Z-axis
ΔX Minor displacement in the direction X
ΔY Minor displacement in the direction Y
ΔZ Minor displacement in the direction Z

The invention claimed is:

1. A device for manufacturing fibrous boards, comprising:
a board carrier;
a plurality of at least four cutting tools for separating fibrous material into portions and for depositing the portions, said cutting tools each having a separation roller having a roller body with an outer circumferential surface and longitudinal recesses extending along a rotational axis of said roller, said separation roller having a plurality of cutters, said cutters being disposed on said outer circumferential surface, said cutting tools further each having one counter roller, said counter roller and said separation roller being rotatable in opposite directions and being disposed for guiding the fibrous material therebetween for severing a portion of the fibrous material by interaction of one of said cutters with said counter roller, said cutting tools having a plurality of releasing elements each having respective retaining regions and being radially outwardly disposed in a respective one of said longitudinal recesses from a position in which said retaining regions are flush with said outer circumferential surface, said cutting tools being configured in each case that at least one of said retaining regions exert a retaining force on the portion for retaining the portion on said counter roller and, after severing, moving conjointly with said roller circumference of said counter roller over a distance;
said releasing elements being configured for depositing the portion by moving away from said roller circumference;
said board carrier being displaceable below said cutting tools in at least one movement direction; and
said cutting tools being substantially stationary and being disposed beside one another for simultaneously depositing the portions beside one another on said board carrier.

2. The device according to claim 1, further comprising at least one transfer unit configured for transferring the portions from said releasing elements initially deposited on a surface of said transfer unit onto said board carrier.

3. The device according to claim 2, wherein the device is configured such that a minimum spacing when depositing between said releasing element and said board carrier, or between said releasing element and a surface of said transfer unit is between 0 and 70 mm.

4. The device according to claim 2, wherein the device is configured such that a minimum spacing when depositing between said releasing element and said board carrier, or between said releasing element and a surface of said transfer unit is between 1 and 10 mm.

5. The device according to claim 1, further comprising at least one binder application installation disposed for applying binder material onto the portions before or after the portions are deposited on said board carrier.

6. The device according to claim 1, wherein said releasing elements are embodied as die elements which are displaceable in a substantially radial manner, and/or are embodied as retaining elements having an integrated retaining region.

7. The device according to claim 1, wherein said retaining regions and one of said separation roller or said counter roller are embodied such that a retaining force may be generated by a vacuum or by electrostatic attraction.

8. The device according to claim 1, wherein said cutting tools in the movement direction of said board carrier are sequentially disposed in at least two rows, in particular such that said depositing cutting tools of one row are disposed so as to form a gap in relation to said depositing cutting tools of the other row.

9. The device according to claim 1, wherein said cutting tools are displaced in terms of a stationary position thereof by minor actuation paths which are smaller than a length of the portions, and/or are rotated about an imaginary Z axis which is perpendicular to said board carrier.

10. The device according to claim 1, wherein said cutting tools are individually controlled.

11. The device according to claim 1, wherein said board carrier is configured to be moved transversely to the movement direction, in an direction X, and/or along a height Z, and/or about an imaginary Z axis which is perpendicular to said board carrier.

12. The device according to claim 1, further comprising a table, said board carrier being configured as a support plate or as a film disposed on said table being movable at least in the movement direction.

13. The device according to claim 1, further comprising additional cutting tools for separating a further fibrous material into further portions and for depositing the further portions on the fibrous material before or while the portions are drawn into said cutting tool.

14. A method for manufacturing fibrous boards, which comprises the steps of:

Providing a device according to claim 1;

a) first separating a respective portion of a fibrous material simultaneously in each of a plurality of depositing cutting tools;

b) second retaining the respective portion on a counter roller or on a separation roller, and moving the respective portion conjointly with a roller circumference of one of the separation roller and the counter roller simultaneously in the plurality of depositing cutting tools;

c) third depositing the portions beside one another simultaneously by way of the plurality of depositing cutting tools;

d) fourth moving a board carrier in at least one movement direction; and e) repeating steps a) to d) multiple times in such a manner that a layer of the portions is produced on the board carrier, and wherein at least one further layer of the portions are produced on a first layer by repeating steps a) to e).

15. The method according to claim 14, which further comprises applying a binder material onto the portions after the portions have been deposited, wherein a binder application is performed between steps c) and d), or in particular after step e) and prior to the further layer being deposited.

16. The method according to claim 14, which further comprises displacing the board carrier after step e) and prior to the further layer being deposited in a direction which is transverse to a movement direction, and/or is rotated in a direction about a Z axis.

* * * * *